US006813541B2

(12) United States Patent
Schlegel

(10) Patent No.: US 6,813,541 B2
(45) Date of Patent: Nov. 2, 2004

(54) METHOD FOR SORTING POSTAL ARTICLES ON AUTOMATIC SORTING DEVICES

(75) Inventor: Dieter Schlegel, Konstanz (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/737,970

(22) Filed: Dec. 18, 2003

(65) Prior Publication Data

US 2004/0129610 A1 Jul. 8, 2004

Related U.S. Application Data

(63) Continuation of application No. PCT/DE02/02243, filed on Jun. 20, 2002.

(30) Foreign Application Priority Data

Jun. 29, 2001 (DE) ........................................ 101 31 031

(51) Int. Cl.[7] ................................................ G06F 7/00

(52) U.S. Cl. ...................... 700/224; 700/223; 700/225; 700/226; 700/227; 209/3.3; 209/569; 209/584; 209/900

(58) Field of Search ................................ 700/223–227; 209/3.3, 569, 584, 900

(56) References Cited

U.S. PATENT DOCUMENTS 5,031,223 A * 7/1991 Rosenbaum et al. ........ 382/101
5,317,654 A * 5/1994 Perry et al. ................ 382/101
5,538,138 A 7/1996 Reich
5,703,783 A * 12/1997 Allen et al. ................ 700/213
6,292,709 B1 * 9/2001 Uhl et al. .................. 700/226
6,587,572 B1 * 7/2003 Suchenwirth-Bauersachs et al. ......................... 382/101
6,665,422 B1 * 12/2003 Seidel et al. ............... 382/101
6,674,038 B1 * 1/2004 Latta ......................... 209/584

FOREIGN PATENT DOCUMENTS

DE 4000603 C2 7/1991
DE 4000603 A 7/1991
DE 19911116 C1 5/2000

OTHER PUBLICATIONS

Derwent Abstract DE19911116–C1.
Derwent Abstract DE4000603 A.
Derwent Abstract DE4000603 C2.

* cited by examiner

*Primary Examiner*—Khoi H. Tran
(74) *Attorney, Agent, or Firm*—Jacob Eisenberg Siemens AG

(57) ABSTRACT

The invention relates to a method for sorting postal articles on automatic sorting devices. According to the invention, the postal articles are read in one or several sorting devices and are pre-sorted in sorting terminal stations according to distributing areas. The pre-sorted postal articles are then conveyed to the sorting devices assigned to the respective distributing areas and are finely sorted based on the applied barcode that indicates the online-read or offline-read address. In order to provide an additional time for offline video encoding before the fine sorting, the postal articles, during the pre-sorting for each distributing area, are sorted in terminal stations for already completely read postal articles and in terminal stations for incompletely read postal articles. This permits the completely read postal articles to be immediately subjected to a fine sorting and enables this time to be used for offline video encoding the incompletely read postal articles.

5 Claims, 6 Drawing Sheets

METHOD FOR SORTING POSTAL ARTICLES ON AUTOMATIC SORTING DEVICES

CONTINUATION DATA

The present application is a continuation of international application PCT/DE02/02243, filed on Jun. 20, 2002, which designated the United States, and further claims priority to German priority document DE 10131031.5, filed on Jun. 29, 2001, the both of which are incorporated herein by reference.

BACKGROUND OF THE INVENTION

The invention relates to a method for sorting postal articles on automatic sorting devices according to the preamble of claim 1.

In the postal services, the distribution of the postal articles is carried out divided up into distribution areas. Each distribution area has a distribution center, in which the postal articles are sorted to the necessary sorting depth as far as the distribution order for a delivery person. The postal articles entering from the first time from the customers are firstly read in the distribution center, sorted in accordance with distribution areas and then dispatched to the distribution centers of the relevant distribution areas or, in the case of postal articles which merely have to be distributed within this distribution center, are finely sorted to the necessary sorting depth.

By using FIGS. 1 and 2, this sequence will be explained in more detail according to the prior art. The incoming postal articles, for example letters, packets, periodicals and the like, are pre-sorted in one or more sorting devices to the various distribution areas 1. For this purpose, the address is read online, firstly with an automatic OCR reader and, if necessary, with the aid of online video coding. In the process, of course, that part of the address which identifies the distribution area (post code or zip code) must be read unambiguously 2. If this is not the case, then an identification (ID tag) is applied (as a sticker or printed on directly) and the postal article is sorted 3 into a special sorting compartment (re-feed compartment). These postal articles are then video coded offline 4, and if the result is not satisfactory, are video coded again. The postal articles are then pre-sorted in an additional pass 1.

In the case of the postal articles that can be sorted to the distribution areas, a check is then made as to whether the address has been read completely 5 for the required sorting depth, for example down as far as the delivery person's route. If yes, the postal articles are deposited in one or more sorting compartments for the appropriate distribution area 6. If no, the postal article is given an identification, if it does not yet have one, and is likewise deposited in this sorting compartment.

Before the postal articles from this sorting compartment are subjected to fine sorting in accordance with the required sorting depth, the incompletely read postal articles must be video coded offline with the ID tags, that is to say, in particular in the case of the postal articles which remain in this distribution area, there is little time for video coding, so that the number of video coding stations has to be increased.

SUMMARY OF THE INVENTION

The invention is therefore based on the object of providing a generic sorting method in which the time interval available for offline video coding before the fine sorting is increased.

The additional time for video coding is obtained by the postal articles, during pre-sorting in accordance with the distribution areas, being sorted for each distribution area into final locations, for example sorting compartments, for already completely read postal articles and into final locations for incompletely read postal articles and not, as hitherto, completely and incompletely read postal articles mixed. This makes it possible to sort the completely read (OCR read and/or online video coded) postal articles finely at once and to use this time for the offline video coding of the incompletely read postal articles.

For example, it is advantageous to transport the pre-sorted postal articles subdivided into completely read and incompletely read postal articles to the distribution centers of those distribution areas in which the transport time is less than the time period for the fine sorting of their local, completely read postal articles. In each distribution center, the fine sorting of the incompletely read postal articles to be video coded offline is then carried out only after the fine sorting of all the separately sent, completely read postal articles. As a result, a further additional gain in time for the offline video coding is achieved.

It is also advantageous to carry out the fine sorting successively on the same sorting devices, in order to keep the number of sorting devices as small as possible.

In order to implement the sorting processes in the shortest possible time, it is advantageous to carry out the fine sorting in parallel on different sorting devices.

In order to obtain additional time for the offline video coding directly before fine sorting, in the case of parallel processes, that is to say fine sorting carried out on different sorting devices, the local postal articles completely video coded for a respective second pre-sorting pass/re-feed pass are advantageously carried out directly to the fine sorting.

BRIEF DESCRIPTION OF THE SEVERAL VIEWS OF THE DRAWINGS

The invention will now be explained in more detail in an exemplary embodiment using the drawing, in which.

DETAILED DESCRIPTION OF THE INVENTION

Figure 1:
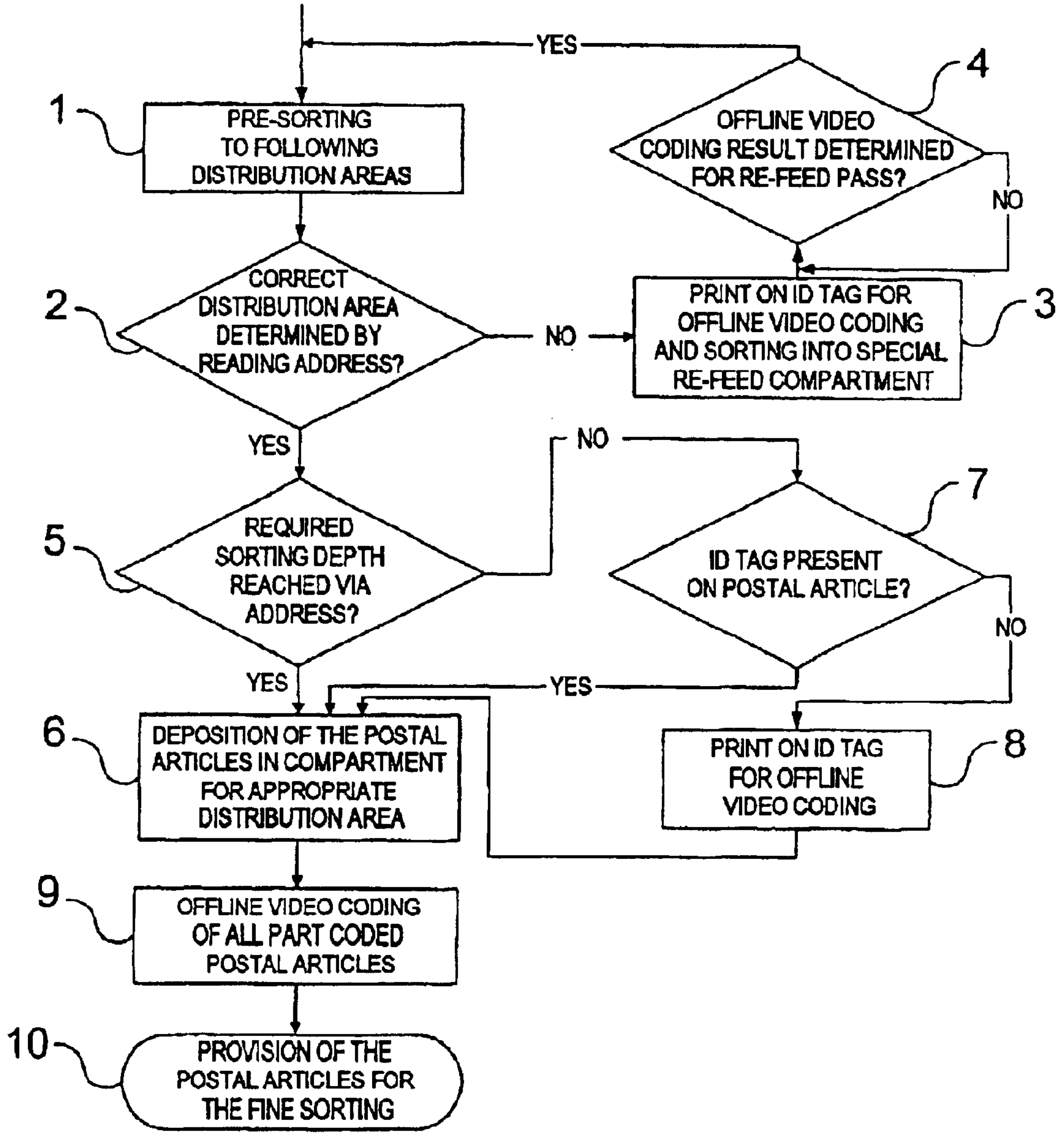
FIG. 1 shows a flowchart of a generic sorting method with pre-sorting and fine sorting and offline video coding according to the prior art.
Figure 2:
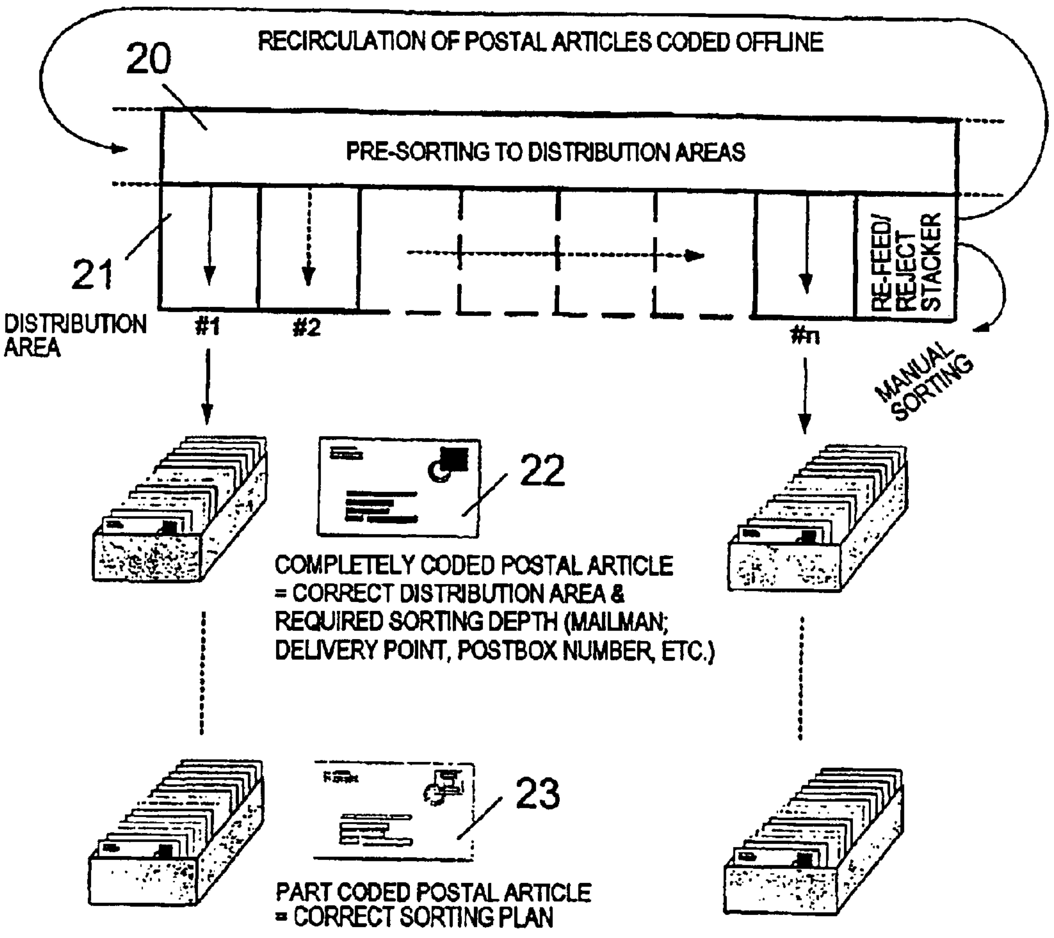
FIG. 2 shows a schematic representation of a sorting device for pre-sorting with sorting compartments according to the prior art.

FIGS. 1 and 2 have already been explained in the prior art.

Figure 3:
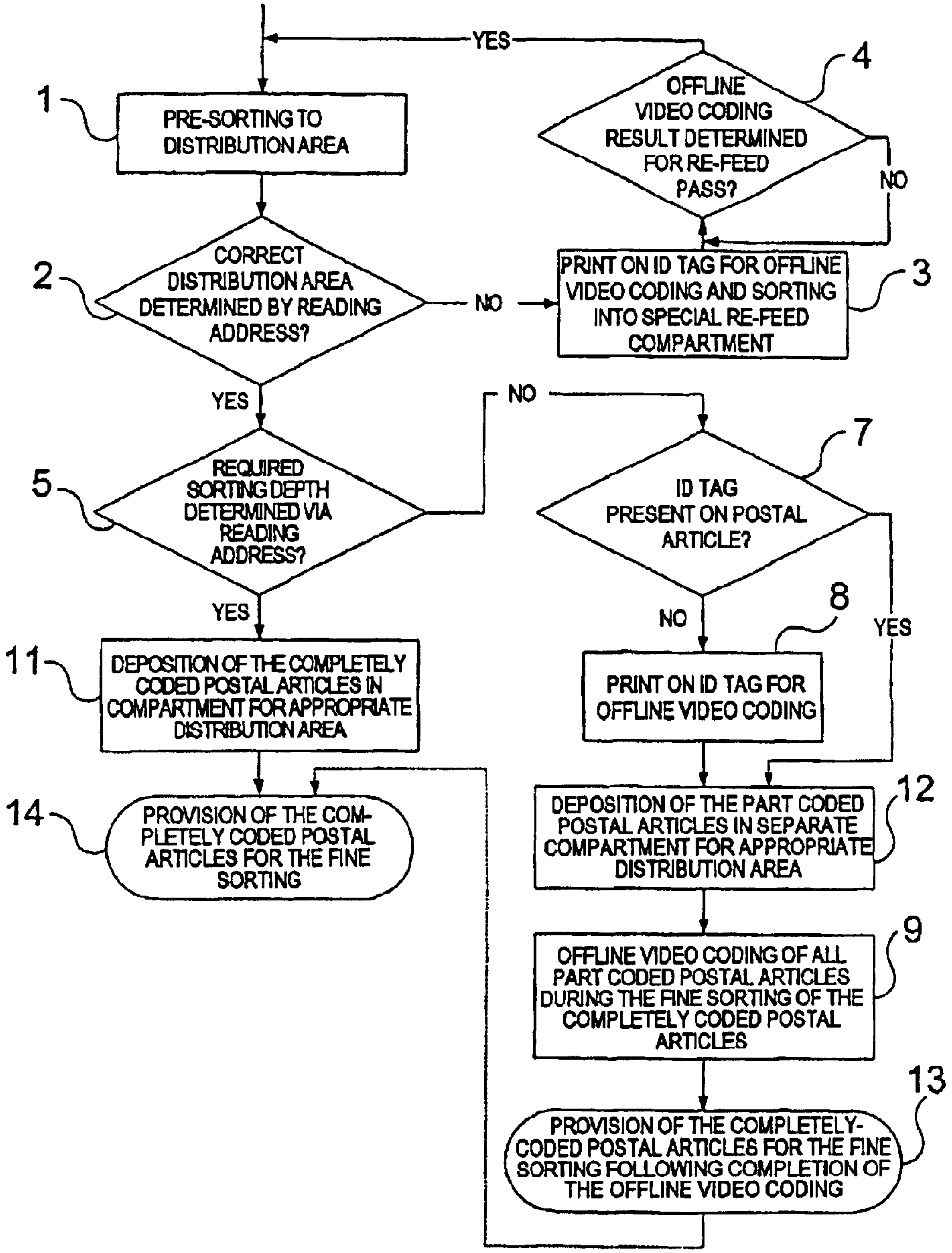
FIG. 3 shows a flowchart of a generic and inventive sorting method with pre-sorting and fine sorting and offline video coding.

According to FIG. 3, in the method according to the invention, the incoming postal articles are likewise pre-sorted 1 in one or more sorting devices to the various distribution areas. For this purpose, following separation, the address is read from each postal article. This is carried out with an automatic OCR reader and, if this is not successful, with the aid of online video coding, in which only that part of the address (zip code, post code) which is necessary for the sorting to the distribution areas is video coded.

If this part of the address could not be determined correctly 2, then the postal article is given an identification (ID tag) and it is sorted 3 into a special sorting compartment (re-feed compartment). These postal articles are then video coded offline 4, if necessary with a repetition loop. After that, these postal articles are pre-sorted into an additional pass. In the case of the postal articles which can be sorted into the distribution areas, a check is then made as to whether the address has been read completely and unambiguously for the necessary sorting depth and has been applied as a bar code 5.

If this is so, then the postal articles are sorted into compartments as final locations for completely and unambiguously read postal articles for the determined distribution areas. Once sufficient postal articles have been sorted in, they are removed from the sorting compartments (automatically or manually) and fed to fine sorting.

If the addresses have not been read completely, a check is made next as to whether the postal articles already have an ID tag. If yes, they are sorted into compartments for incompletely (partly coded) read postal articles for the determined distribution areas 12.

If there is no ID tag, this is applied beforehand 9 to the postal article. The offline coding is then carried out for the purpose of reading the address completely with the application of a bar code having the address in encoded form. For this offline video coding, the time interval during which the completely read postal articles for this distribution area are finely sorted is additionally used. Therefore, video coding stations can be saved. This effect is the greatest in the case of postal articles to be coded for the local distribution area, since here no substantial transport time (transport of the postal articles between the distribution centers) can be used for the video coding.

These postal articles are then likewise provided for fine sorting 13.

Figure 4:
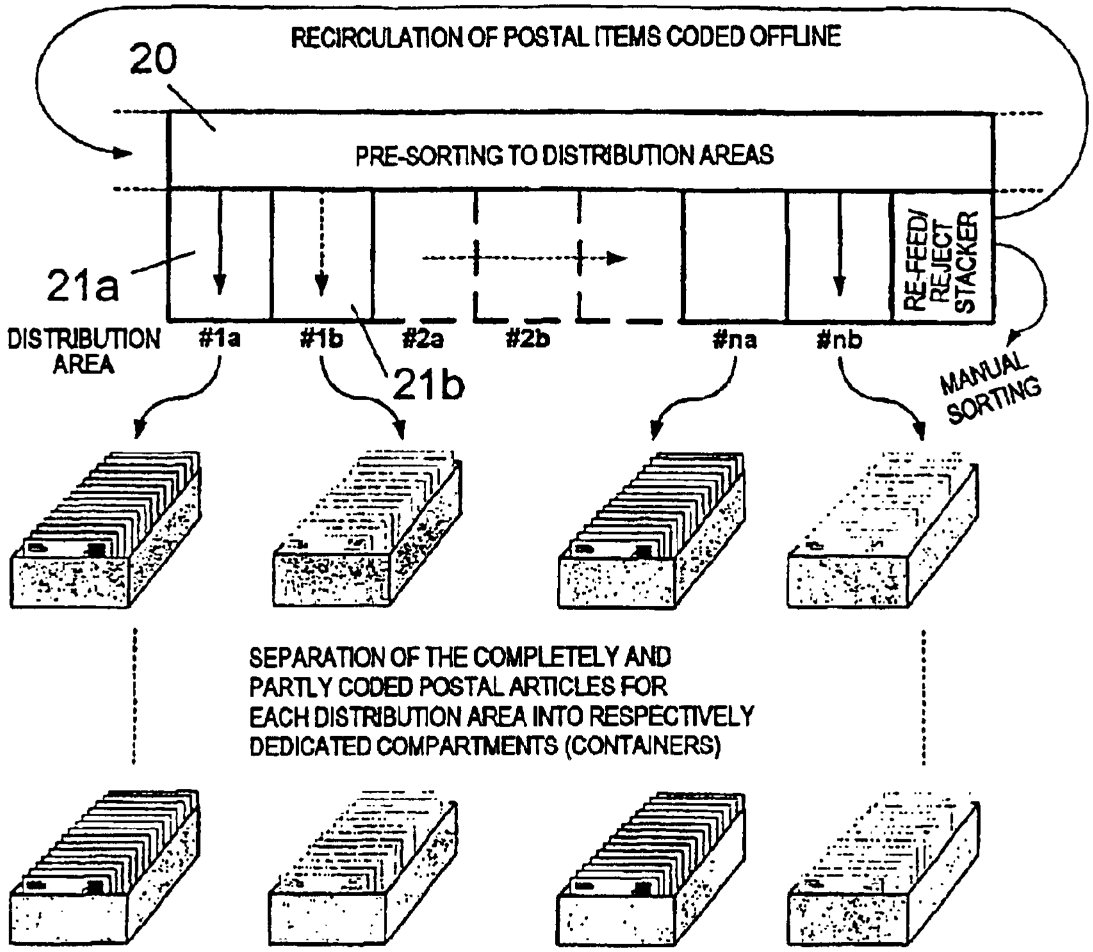
FIG. 4 shows a schematic representation of a sorting device for pre-sorting with a division of the sorting compartments for one distribution area in each case.

FIG. 4 illustrates schematically that, in a sorting device 20 for each distribution area 1-n, the final locations (compartments) 21 are subdivided into final locations for postal articles with completely read addresses 21*a* and into final locations for postal articles with completely read addresses 21*b*.

Figure 5A:
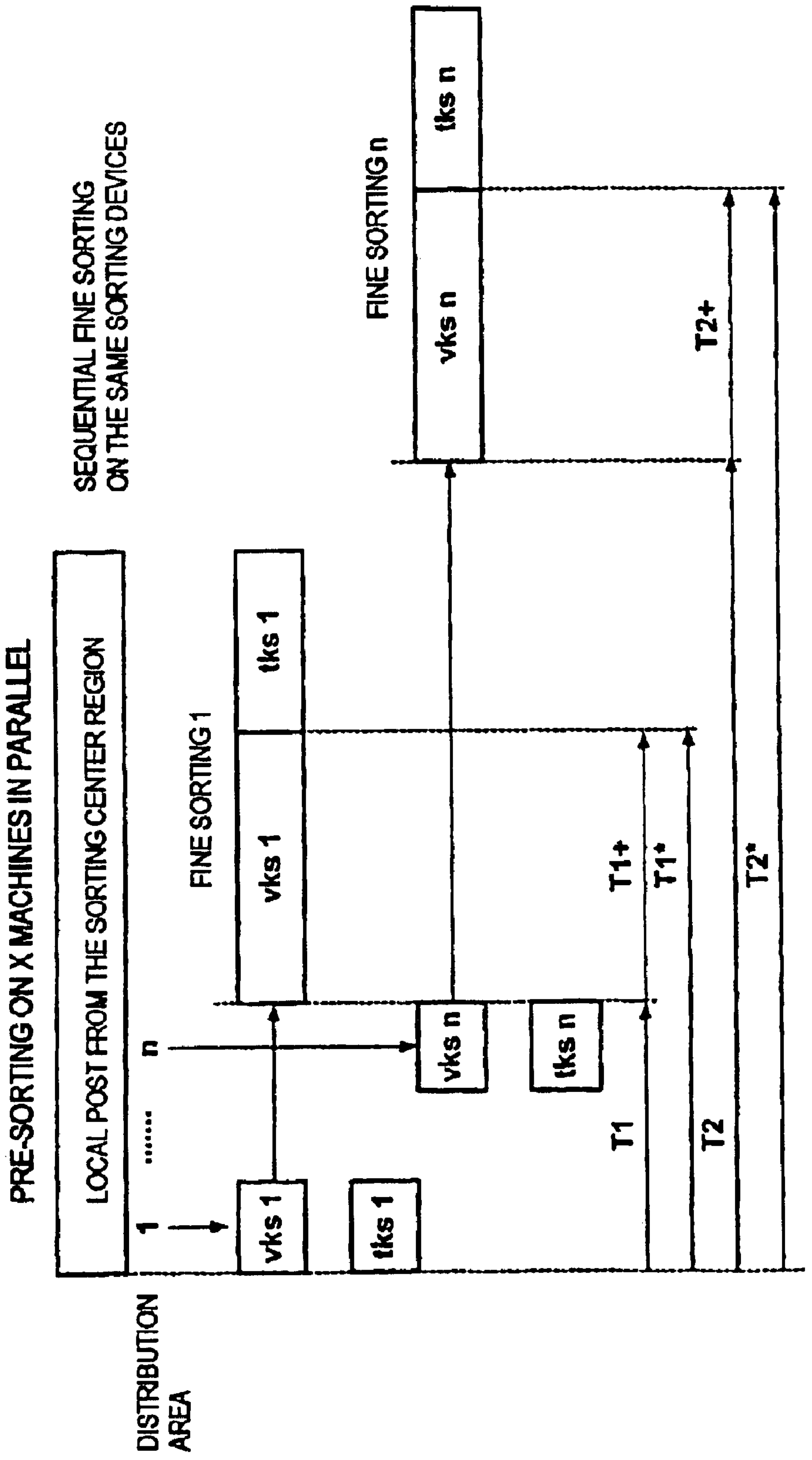
FIG. 5*a* shows a time sequence in the case of sequential fine sorting on the same sorting devices.
Figure 5B:
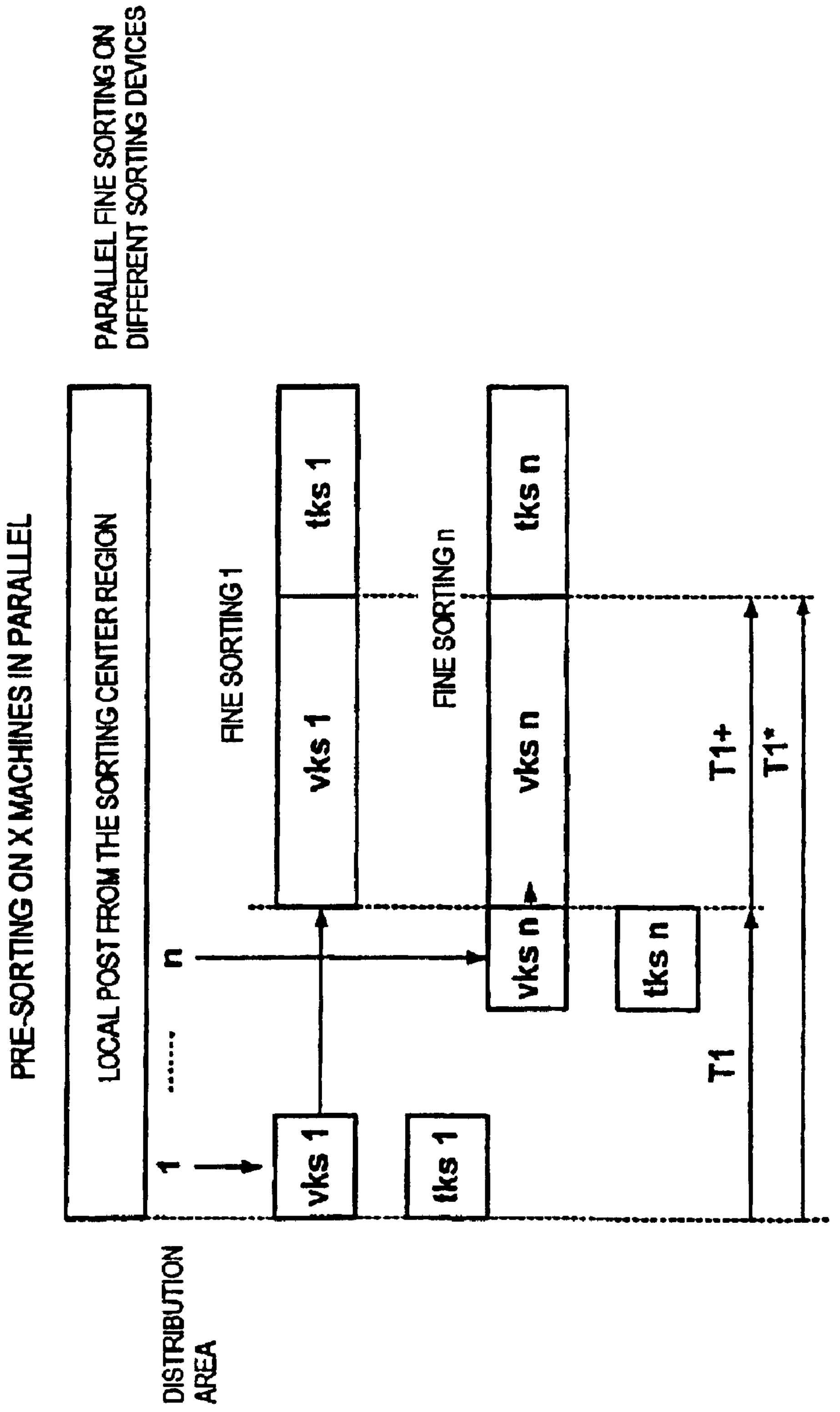
FIG. 5*b* shows a time sequence in the case of parallel fine sorting on different sorting devices.

In FIGS. 5*a* and 5*b*, the principle of the additional time gain for the offline video coding of the complete address is illustrated pictorially.

Here:

vks x=completely coded postal article for distribution area x tks x=partly coded postal article for distribution area x T1/T2=available time for the offline video coding in the case of postal articles not separated in accordance with vks and tks T1*/T2*=total available time for the offline video coding in the case of separate vks/tks proportions of postal articles T1+/T2+=additional time for the offline video coding in the case of separate vks/tks proportions of postal articles.

FIG. 5*a* shows the time sequence in the case of the pre-sorting and fine sorting of local postal articles, that is to say of postal articles from the area of the distribution (sorting) center whose recipient addresses likewise fall in the area of this distribution center. The pre-sorting is carried out in parallel on 1 to x sorting devices, the subsequent fine sorting successively on the same sorting devices.

FIG. 5*b* illustrates the time sequence in the case of parallel fine sorting on different sorting devices. As can be seen, in this case the greatest percentage time gain is to be recorded.

If further separately sent, completely read postal articles to be sorted finely are added from other distribution centers, in which the transport times are less than the times for fine sorting of the locally completely read postal articles, these postal articles are also finely sorted before the postal articles to be coded offline. In the process, the time available for the offline video coding is again increased.

I claim:

1. A method for sorting postal articles on automatic sorting devices, comprising the steps of:

reading the postal articles in one or more sorting devices;

providing each of the postal articles with a bar code, the bar code comprising a clearly and completely online readable address in encoded form or an identification code in the case of an unclear or incomplete result of the online reading operation, pre-sorting the postal articles into final sorting locations in accordance with distribution areas, transporting the pre-sorted postal articles to sorting devices assigned to respective distribution areas, finely sorting the postal articles via the barcode, subdividing postal articles according to distribution final locations, the final locations being associated with defined distribution areas, the postal articles including completely and clearly read addresses and unclearly and/or incompletely read addresses, finely sorting the postal articles from the final locations for the postal articles with the online completely and clearly read and appropriately coded addresses, finely sorting the postal articles with the postal articles clearly and completely read and appropriately coded offline, and offline coding the remaining incompletely read address postal articles while fine sorting of the online completely and clearly read postal articles.

2. The method according to claim 1, wherein:

the pre-sorted postal articles are transported, subdivided into completely read and incompletely read postal articles, to the distribution centers of those distribution areas in which the transport time is less than the time period for the fine sorting of their local, completely read postal articles, and in each distribution center, the fine sorting of the incompletely read postal articles to be video coded offline is carried out only after the fine sorting of all the separately sent, completely read postal articles.

3. The method according to claim 1, wherein the fine sorting is carried out successively on the same sorting devices, and only partly read postal articles are stored temporarily.

4. The method according to claim 1, wherein the fine sorting is carried out in parallel on different sorting devices.

5. The method according to claim 4, wherein local postal articles video coded completely for a respective second pre-sorting pass or re-feed pass are supplied directly to the fine sorting.

* * * * *